3,080,381
OPTIONALLY 6-METHYLATED AND OPTIONAL-
LY 17-ALKANOYLOXYGENATED 2-OXAPREG-
NANE-3,20-DIONES, A-HOMO COMPOUNDS COR-
RESPONDING, AND 4,5-DEHYDRO AND 4,5;6,7-
BISDEHYDRO DERIVATIVES THEREOF
Raphael Pappo, Skokie, Ill., assignor to G. D. Searle &
  Co., Chicago, Ill., a corporation of Delaware
No Drawing. Filed Feb. 16, 1962, Ser. No. 173,800
         17 Claims. (Cl. 260—343.2)

The present invention relates to A-ring oxygenhetero-cyclic steroids of the pregnane series and, more particularly, to optionally 6-methylated and optionally 17-alkanoyl-oxygenated 2-oxapregnane-3,2-diones, A-homo compounds corresponding, and 4,5-dehydro and 4,5;6,7-bis-dehydro derivatives thereof, which can be represented by the formula

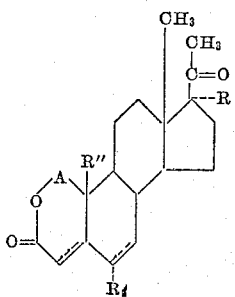

wherein A is a methylene or ethylene radical, R can be hydrogen or a (lower alkanoyl)oxy radical, R' and R'' can be hydrogen or a methyl radical, and the dotted lines indicate the optional presence of double bonds between carbon atoms 4 and 5 and between carbon atoms 6 and 7.

The lower alkanoyl radicals encompassed by the R term are, typically, formyl, acetyl, propionyl, butyryl, valeryl, caproyl, and the branched-chain isomers thereof.

Starting materials suitable for the manufacture of the instant 10-methyl-2-oxa compounds are the pregna-1,4-diene-3,20-diones of the structural formula

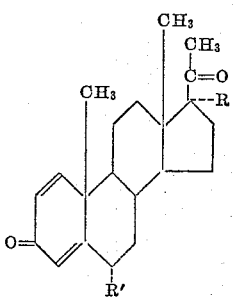

wherein R is hydrogen or a (lower alkanoyl)oxy group and R' is hydrogen or a methyl radical. These 1,4-dienes are converted to the corresponding 1,2-diols, suitably by reaction with potassium chlorate in the presence of a catalytic quantity of osmium tetroxide. Cleavage of these 1,2-diols, preferably by treatment with lead tetracetate, produces the intermediate 1,2-seco-A-norpregn-3-en-2-oic acids, which exist as an equilibrium mixture of the aldehydo-acid and lactol forms as is represented below:

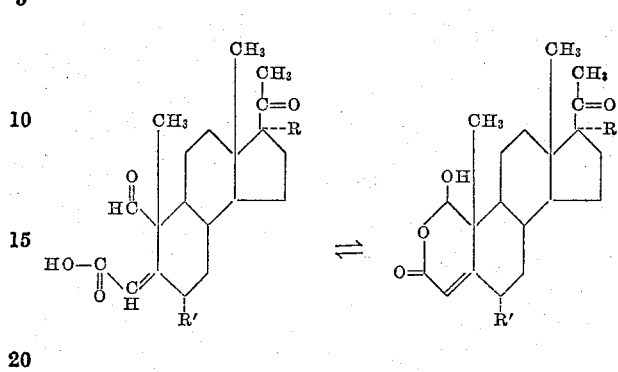

in which representation R and R' have the identical meanings indicated supra. The 2-oxa-Δ⁴ compounds of this invention which possess an oxygenated function at carbon atom 17 are obtained directly by reduction of the latter 1,2-seco-2-oic acids, suitably by means of a reducing agent such as sodium borohydride. In the case of the instant 2-oxa-Δ⁴ compounds which lack a 17-oxygen-containing function, this reduction step results also in conversion of the 20-oxo group to a 20-hydroxy function. Oxidation of the resulting 20-hydroxy substances, suitably by means of chromic acid, affords the desired instant 2-oxapregn-4-ene-3,20-diones. These processes are specifically illustrated by the reaction of pregna-1,4-diene-3,20-dione with potassium chlorate and osmium tetroxide in aqueous tertiary-butyl alcohol to yield 1,2-dihydroxypregn-4-ene-3,20-dione, cleavage of the latter 1,2-diol by means of lead tetracetate in aqueous acetic acid to produce 1,20-dioxo-1,2-seco-A-norpregn-3-en-2-oic acid, reduction of the latter aldehydo-acid in chloroform with alkaline sodium borohydride to afford 20-hydroxy-2-oxapregn-4-en-3-one, and oxidation of that 20-hydroxy substance in acetone with aqueous chromic acid to yield 2-oxapregn-4-ene-3,20-dione.

Catalytic hydrogenation of the instant 2-oxa-Δ⁴ compounds, preferably in the presence of a palladium catalyst, affords the 2-oxa-4,5-dihydro compounds of this invention. For example, the aforementioned 2-oxapregn-4-ene-3,20-dione in ethanol is treated with hydrogen in the presence of 10% palladium-on-carbon catalyst to afford a mixture of the 5α and 5β isomers of 2-oxapregnane-3,20-dione, which are separable chromatographically. These 4,5-dihydro compounds are obtained also in the aforementioned sodium borohydride reduction process of the intermediate aldehydo-acids. For example, the reduction of 1,20-dioxo-1,2-seco-A-norpregn-3-en-2-oic acid, described supra, affords also 20-hydroxy-2-oxapregnan-3-one. Chromic acid oxidation of that substance affords the 5α and 5β epimers of 2-oxapregnane-3,20-dione.

A method particularly suitable for the preparation of the 4,5;6,7-bisdehydro compounds of this invention utilizes as the starting material, a compound of the formula

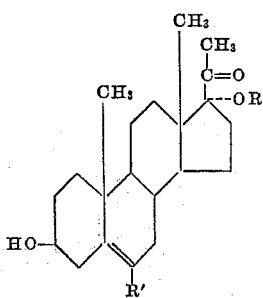

wherein R is a lower alkanoyl radical of the type defined above, and R' can be hydrogen or a methyl radical. As a specific example, 17α-acetoxy - 3β - hydroxy-6-methylpregn-5-en-20-one is epoxidized, typically with perbenzoic acid, to produce 17α-acetoxy-5α,6α-epoxy-3β-hydroxy-6β-methylpregnan-20-one together with the corresponding 5β,6β-epoxide. Reaction of either of the latter epoxides in acetone with aqueous chromic acid affords 17α-acetoxy - 5α,6β - dihydroxy-6α-methylpregnane-3,20-dione, which yields 17α-acetoxy-6β-hydroxy-6α-methylpregna-1,4-diene-3,20-dione upon treatment with dichlorodicyanoquinone in benzene. The corresponding isomeric 6α-hydroxy-6β-methyl compound is obtained by reacting the aforementioned 17α-acetoxy-5α,6α-epoxy-3β-hydroxy-6β-methylpregnan-20-one with chromium trioxide in pyridine to afford 17α-acetoxy-6α-hydroxy-6β-methylpregn-4-ene-3,20-dione, and allowing the latter compound to react with dichlorodicyanoquinone in benzene, thus producing 17α-acetoxy-6α-hydroxy-6β-methylpregna-1,4-diene-3,20-dione. Either of the two 6-hydroxy-6-methyl isomers can be utilized in the following sequence of reactions to obtain the desired compounds of this invention. Typically, 17α-acetoxy-6β-hydroxy-6α-methylpregna-1,4-diene-3,20-dione is converted to the corresponding 1,2-glycol upon reaction with osmium tetroxide and potassium chlorate in aqueous tertiary-butyl alcohol. Cleavage of that glycol with lead tetracetate and acetic acid affords 17α-acetoxy-6β-hydroxy-6α-methyl-1-oxo-1,2-seco-A-norpregn-3-en-2-oic acid, which is converted to 17α-acetoxy-6β-hydroxy-6α-methyl-2-oxapregn-4-ene-3,20-dione by reduction, suitably with sodium borohydride in isopropyl alcohol. Dehydration of that 6-hydroxy compound, suitably by heating in toluene solution with p-toluenesulfonic acid or, alternatively, by reaction with phosphorus oxychloride in pyridine, results in the instant 17α-acetoxy-6-methyl-2-oxapregna-4,6-diene-3,20-dione.

A process particularly advantageous for the manufacture of the 3-oxa compounds of this invention utilizes as the starting material a compound of the formula

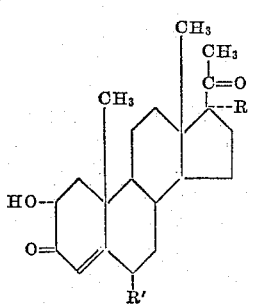

wherein R is hydrogen or a (lower alkanoyl)oxy radical, and R' is hydrogen or a methyl radical. The latter substances are obtained by bromination of the corresponding compounds of the formula

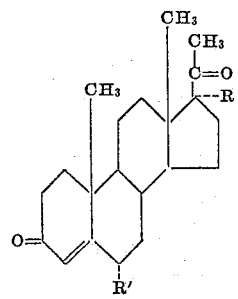

followed by reaction with an alkali metal acetate and hydrolysis of the resulting 2α-acetoxy compound. As a specific example, 17α-acetoxypregn-4-ene-3,20-dione is treated with N-bromosuccinimide in carbon tetrachloride, and the resulting 6-bromo derivative is allowed to react with potassium acetate in acetic acid to yield 2α,17α-diacetoxypregn-4-ene-3,20-dione. Hydrolysis of that acetate, for example with potassium hydroxide in aqueous methanol, affords 17α-acetoxy - 2α - hydroxypregn-4-ene-3,20-dione. The 2α-hydroxy intermediates containing a 6α-methyl substituent are preferably obtained by reacting the 6α-methyl substances represented by the latter structural formula with lead tetracetate in acetic acid. Hydrolysis of the resulting 2α-acetoxy derivative affords the required 2α - hydroxy intermediates. Typically, 17α-acetoxy-6α-methylpregn-4-ene-3,20-dione is allowed to react with lead tetracetate in acetic acid to yield 2α,17α-diacetoxy-6α-methylpregn-4-ene-3,20-dione, which affords 17α-acetoxy - 2α - hydroxy-6α-methylpregn-4-ene-3,20-dione upon reaction with potassium hydroxide in aqueous methanol.

Reaction of the aforementioned 2α-hydroxy intermediates with periodic acid in aqueous pyridine results in cleavage of the A-ring to yield the corresponding 2,20-dioxo-2,3-secropregn-4-en-3-oic acids, which are in equilibrium with the lactol form, as is represented below:

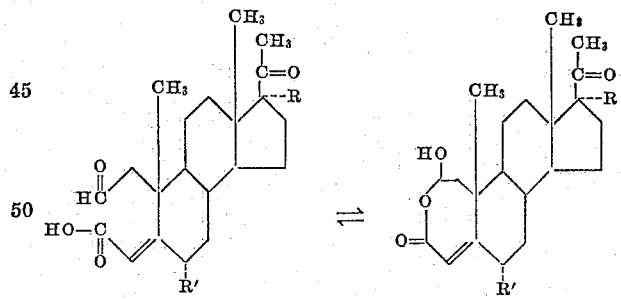

Reaction of the latter 2-oxo-2,3-seco intermediates with a suitable reducing agent produces the corresponding 2-hydroxy compounds, which are converted to the instant 3-oxa-4-ones by heating. Those intermediates lacking a 17α-(lower alkanoyl)oxy substituent produce 2,20-dihydroxy derivatives upon reduction, thus necessitating an additional oxidation step to regenerate the 20-keto group. The latter processes are specifically illustrated by the reaction of 2α-hydroxypregn-4-ene-3,20-dione with periodic acid dihydrate in aqueous pyridine to afford 2,20-dioxo-2,3-secopregn-4-en-3-oic acid, which is treated with aqueous sodium borohydride, resulting in 2,20-dihydroxy - 2,3 - secopregn-4-en-3-oic acid. The latter hydroxy-acid is heated at about 100° to yield 20-hydroxy-3-oxa-A-homopregn-4a-en-4-one, which is oxidized, for example with chromium trioxide in acetone, thus producing 3-oxapregn-4a-ene-4,20-dione.

The 19-nor compounds of this invention are conveniently manufactured by utilizing as a starting material, 6-oxo-5α-pregnane-3β,20β-diol 3,20-diacetate, described by I. Iwai and J. Hiraoka, Chem. and Pharm. Bull.

Japan, 7:395 (1959). Reaction of this material with hydrogen and platinum oxide in acetic acid or reaction with methyl magnesium bromide, followed by acidification and reacetylation, affords the 6β-hydroxy and 6β-hydroxy-6α-methyl compounds, respectively, of the structural formula

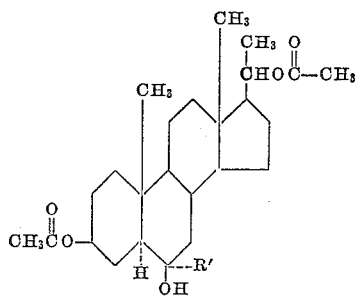

wherein R' is hydrogen or a methyl radical. Reaction of the latter substances with lead tetracetate affords the corresponding 6β,19-epoxy compounds, which are hydrolyzed, typically with alkali, to afford the 6β,19-epoxy-3,20-diols. Oxidation of these diols, for example with chromic acid, produces the corresponding 6β,19-epoxy-3,20-diones. The latter diones are converted to the corresponding 17α-acyloxy intermediates, suitably by the following sequence of reactions. The 3-keto group is protected by treatment with methanol and acid to yield the dimethyl ketal, which is treated with oxygen in the presence of potassium tertiary-butoxide, then with zinc and acetic acid to introduce the 17α-hydroxy moiety. Acylation of these 17α-ols, typically by means of a lower alkanoic acid anhydride in the presence of the lower alkanoic acid affords the corresponding 17α-alkanoates.

By the aforementioned processes are provided intermediates of the structural formula

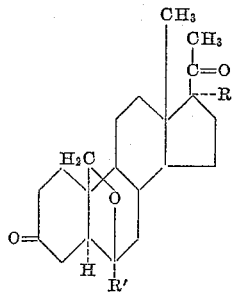

wherein R is hydrogen or a (lower alkanoyl)oxy radical and R' is hydrogen or a methyl radical. Treatment of these intermediates with bromine followed by dehydrobromination, typically by heating with collidine, yields the corresponding 1-dehydro compounds, which are oxidized with chromic acid, then treated with alkali and finally acetylated to afford the corresponding 6β-acetoxy-19-nor substances. Cleavage of the 1,2-double bond, suitably by reaction with lead tetracetate and osmium tetroxide, followed by treatment with a reducing agent such as sodium borohydride, then regeneration of the 20-oxo group in the case of the compounds lacking the 17α-acyloxy substituent, affords the 6β-acetoxy-2-oxa-3,20-diones. Reaction of these substances with alkali affords the corresponding 6β-hydroxy compounds, which are dehydrated and isomerized, typically by means of phosphorus oxychloride and pyridine to afford the desired 2-oxa compounds of the structural formula

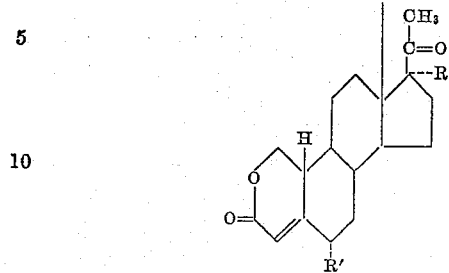

wherein R is hydrogen or a (lower alkanoyl)oxy radical and R' is hydrogen or a methyl radical.

The latter processes are specifically illustrated by the following sequence of reactions. The aforementioned 6-oxo-5α-pregnane-3β,20β-diol 3,20-diacetate is treated with hydrogen and platinum oxide in acetic acid to afford 5α-pregnane-3β,6β,20β-triol 3,20-diacetate, which is converted to 6β,19-epoxy-5α-pregnane-3β,20β-diol 3,20-diacetate by reaction with lead tetracetate. Hydrolysis of the latter di-ester by means of sodium hydroxide, followed by chromic acid oxidation produces 6β,19-epoxy-5α-pregnane-3,20-dione. Bromination followed by dehydrobromination, typically by heating with collidine, yields 6β,19-epoxy-5α-pregn-1-ene-3,20-dione, which is treated with chromium trioxide to afford the corresponding 19-oxo compound. Treatment of that substance with alkali followed by acetylation with acetic anhydride results in 6β-acetoxy-19-nor-5α-pregn-1-ene-3,20-dione. Reaction of this compound with lead tetracetate and osmium tetroxide affords 6β-acetoxy-1-hydroxy-2-oxa-19-nor-5α-pregnane-3,20-dione. Reduction of the latter lactol, suitably with sodium borohydride, followed by acidification and treatment with chromium trioxide produces 6β-acetoxy-2-oxa-19-nor-5α-pregnane-3,20-dione. Reaction with alkali to afford the 6β-ol, then dehydration, typically with phosphorus oxychloride and pyridine, affords 2-oxa-19-norpregn-4-ene-3,20-dione.

When the aforementioned 6-oxa-5α-pregnane-3β,20β-diol 3,20-diacetate is treated with methyl magnesium bromide in tetrahydrofuran, the resulting product, after acidification and reacetylation, is 6α-methyl-5α-pregnane-3β,6β,20β-triol 3,20-diacetate. Utilization of this starting material in the processes described supra results in 6α-methyl-2-oxa-19-norpregn-4-ene-3,20-dione.

The aforementioned 6β,19-epoxy-5α-pregnane-3,20-dione can be converted to the corresponding 17α-acetoxy compound by ketalization of the 3-oxo group with methanol in the presence of a mineral acid, then introduction of the 17-hydroxy group by reaction with oxygen in the presence of potassium tertiary-butoxide followed by treatment with zinc and acetic acid, and finally acetylation with acetic anhydride and acetic acid in the presence of an acid catalyst. The resulting 17α-acetoxy-6β,19-epoxy-5α-pregnane-3,20-dione can be converted to 17α-acetoxy-2-oxa-19-norpregn-4-ene-3,20-dione by the aforementioned processes.

The compounds of this invention display valuable pharmacological properties. They are hormonal agents as is evidenced, for example, by their potent progestational activity.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples, temperatures are given in degrees centigrade (° C.). Quantities of materials are expressed in parts by weight unless otherwise noted.

This application is a continuation-in-part of my copending application Serial No. 150,662, filed November 7, 1961.

Example 1

A solution of 65 parts of pregna-1,4-diene-3,20-dione in 1170 parts of tertiary-butyl alcohol is diluted with 1300 parts of water, and the resulting suspension is treated successively with 12.42 parts of potassium chlorate and 6.21 parts of osmium tetroxide. This suspension is stirred at room temperature for about 2 weeks, then is concentrated at room temperature and reduced pressure to about 500 parts by volume. The black oily layer which forms is separated and dissolved in 294 parts of pyridine, treated with 10 parts of sodium bisulfite in 150 parts of water, then stirred at room temperature for about 15 hours. This mixture is extracted with benzene, and the organic layer is separated, washed successively with dilute hydrochloric acid, water, aqueous sodium hydroxide, and water, dried over anhydrous sodium sulfate, and evaporated to dryness at reduced pressure. Recrystallization of the residue from benzene affords pure 1,2-dihydroxypregn-4-ene-3,20-dione, which melts at about 162–173°. It exhibit maxima in the infrared at about 2.80, 2.88, 3.41, 5.90, and 6.18 microns and also an ultraviolet absorption maximum at about 239 millimicrons with a molecular extinction coefficient of about 12,100.

Example 2

To a solution of 3.55 parts of 1,2-dihydroxypregn-4-ene-3,20-dione in 84 parts of acetic acid containing 12 parts of water is added 13.64 parts of lead tetracetate, and this reaction mixture is stirred at 50–60° for about 1¾ hours. The unreacted tetracetate is destroyed by the addition of 0.6 part of formic acid, and the resulting solution is diluted with water, then extracted with chloroform. The chloroform layer is washed successively with dilute aqueous potassium carbonate and water, dried over anhydrous sodium sulfate, and evaporated to dryness at reduced pressure. Trituration of the crystalline residue with boiling benzene yields 1,20-dioxo-1,2-seco-A-norpregn-3-en-2-oic acid, M.P. about 213–220°. It is further characterized by an ultraviolet absorption maximum of about 226.5 millimicrons with a molecular extinction coefficient of about 14,300.

Example 3

To a solution of one part of 1,20-dioxo-1,2-seco-A-norpregn-3-en-2-oic acid in 19.4 parts of chloroform is added a solution of one part of sodium borohydride in 13 parts of water containing 1.3 parts by volume of 10% aqueous sodium hydroxide, and the resulting mixture is stirred at room temperature for about four hours. The layers are then separated, and the organic solution is washed successively with dilute aqueous sodium hydroxide and water, dried over anhydrous sodium sulfate, and evaporated to dryness. The residue is crystallized from ether to afford a mixture of the 20α and 20β isomers of 20-hydroxy-2-oxapregn-4-en-3-one, melting at about 170–176°.

The aqueous alkaline layer from the chloroform extraction is acidified, then extracted with chloroform to yield an organic solution, which is washed successively with dilute sodium hydroxide and water, dried over anhydrous sodium sulfate, and evaporated to dryness. Recrystallization of the residue from ether affords a mixture of the epimeric 20-hydroxy-2-oxapregnan-3-ones, melting at about 192–200°.

Example 4

To a solution of 6 parts of 20-hydroxy-2-oxapregn-4-en-3-one in 16 parts of acetone is added dropwise, 6 parts by volume of an aqueous solution, 8 N in chromium trioxide and 8 N in sulfuric acid. The addition of a small quantity of isopropyl alcohol results in destruction of the excess reagent, and the resulting solution is concentrated under nitrogen at room temperature to afford a residue which is extracted with benzene. The benzene layer is washed successively with water, aqueous sodium hydroxide, and water, then dried over anhydrous sodium sulfate, and concentrated to dryness at reduced pressure. Recrystallization of this residue from isopropyl alcohol affords pure 2-oxapregn-4-ene-3,20-dione, M.P. about 168–169°. It is further characterized by an ultraviolet absorption maximum at about 223.5 millimicrons with a molecular extinction coefficient of about 14,150, and is represented by the structural formula

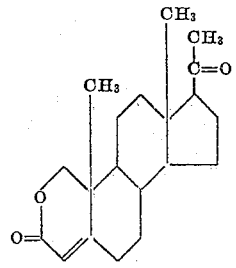

Example 5

A solution of 50 parts of 17α-acetoxypregna-1,4-diene-3,20-dione in 1,092 parts of tertiary-butyl alcohol is diluted with 700 parts of water, and the resulting mixture is treated with 7 parts of potassium chlorate and 3.5 parts of osmium tetroxide. This reaction mixture is stirred at room temperature for about 28 days, then is concentrated at reduced pressure to a volume of about 200 parts. Extraction of this residual mixture with chloroform affords an organic solution, which is concentrated to dryness. Fractional crystallization of the residue from benzene affords 17α-acetoxy-4,5-dihydroxypregn-1-ene-3,20-dione and 17α-acetoxy-1,2-dihydroxypregn-4-ene-3,20-dione.

The substitution of an equivalent quantity of 17α-propionoxypregna-1,4-diene-3,20-dione in the process of this example results in 4,5-dihydroxy-17α-propionoxypregn-1-ene-3,20-dione and 1,2-dihydroxy-17α-propionoxypregn-4-ene-3,20-dione.

Example 6

To 9 parts of the mixture of 17α-acetoxy-4,5-dihydroxypregn-1-ene-3,20-dione and 17α-acetoxy-1,2-dihydroxypregn-4-ene-3,20-dione dissolved in 105 parts of acetic acid containing 10 parts of water is added 30.3 parts of lead tetracetate, and the resulting reaction mixture is stirred at 50–60° for about 1¾ hours. This mixture is diluted with chloroform, then washed successively with water, dilute aqueous potassium carbonate, and water dried over anhydrous sodium sulfate, and evaporated to dryness. Trituration of the residue with benzene followed by recrystallization from chloroform results in pure 17α-acetoxy-1,20-dioxo-1,2-seco-A-norpregn-3-en-2-oic acid, which melts at about 285–288°. It displays a maxima in the ultraviolet at about 226 millimicrons with a molecular extinction coefficient of about 14,400.

By substituting an equivalent quantity of the mixture of 4,5-dihydroxy-17α-propionoxypregn-1-ene-3,20-dione and 1,2-dihydroxy-17α-propionoxypregn-4-ene-3,20-dione in the procedure of this example, 1,20-dioxo-17α-propionoxy-1,2-seco-A-norpregn-3-en-2-oic acid is obtained.

Example 7

A mixture of 2.73 parts of 17α-acetoxy-1,20-dioxo-1,2-seco-A-norpregn-3-en-2-oic acid, 2.7 parts of sodium borohydride and 35.6 parts of isopropyl alcohol is stirred at room temperature for about 10 minutes, at the end of which time the mixture becomes homogeneous. This solution is allowed to stand at room temperature for about 1¾ hours, then is cooled by means of an ice bath and treated with 40 parts of acetone. This mixture is poured into an ice-cold solution containing 40 parts of acetone, 200 parts of water, and 12 parts of concentrated hydrochloric acid. Removal of the solvents by evaporation at reduced pressure affords a residue, which is extracted with chloroform. The resulting organic solution is separated, washed successively with cold dilute aqueous sodium hydroxide and water, dried over anhydrous sodium sulfate, then evaporated to dryness at reduced pressure. Recrystallization of the residue from isopropyl alcohol results in 17α-acetoxy-2-oxapregn-4-ene-3,20-dione, which melts at about 269–275°. It displays an ultraviolet absorption maximum at about 223.5 millimicrons with a molecular extinction coefficient of about 14,900. It is represented by the structural formula

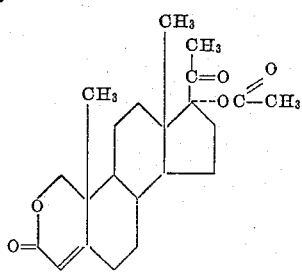

The substitution of an equivalent quantity of 1,20-dioxo-17α-propionoxy-1,2-seco-A-norpregn-3-en-2-oic acid in the process of this example affords 17α-propionoxy-2-oxapregn-4-ene-3,20-dione.

Example 8

To a solution of 10 parts of 17α-acetoxy-6α-methylpregna-1,4-diene-3,20-dione in 70.6 parts of pyridine is added, at 5°, a solution of 6.64 parts of osmium tetroxide in 39.2 parts of pyridine. This reaction mixture is stored at room temperature for about 5 days, then is stirred with a solution of 30 parts of sodium bisulfite in 500 parts of water containing 294 parts of pyridine for about 15 hours. This aqueous mixture is extracted with chloroform, and the organic layer is washed successively with water, cold dilute hydrochloric acid, and water, dried over anhydrous sodium sulfate, and evaporated to dryness at reduced pressure to afford 17α-acetoxy-1,2-dihydroxy-6α-methylpregn-4-ene-3,20-dione.

The substitution of an equivalent quantity of 6α-methyl-17α-propionoxypregna-1,4-diene-3,20-dione in the process of this example results in 1,2-dihydroxy-6α-methyl-17α-propionoxypregn-4-ene-3,20-dione.

Example 9

A solution of 10 parts of 6α-methylpregna-1,4-diene-3,20-dione in 75 parts of pyridine is cooled to about 5°, then is treated with a solution of 5.7 parts of osmium tetroxide in 40 parts of pyridine. After standing at room temperature for about 5 days, a solution of 30 parts of sodium bisulfite in 500 parts of water containing 300 parts of pyridine is added, and the resulting mixture is stirred for about 16 hours. Extraction of this aqueous mixture with chloroform yields an organic solution, which is washed successively with water, dilute hydrochloric acid, and water, then dried over anhydrous sodium sulfate, and concentrated to dryness in vacuo to afford 1,2-dihydroxy-6α-methylpregn-4-ene-3,20-dione.

Example 10

A solution of 3 parts of 17α-acetoxy-1,2-dihydroxy-6α-methylpregn-4-ene-3,20-dione in 35 parts of acetic acid containing 3.3 parts of water is treated with 10.1 parts of lead tetracetate. This reaction mixture is heated at 50–60°, with stirring, for about 2 hours, then is cooled and diluted with chloroform. The resulting mixture is washed successively with water, aqueous potassium carbonate, and water. The washed chloroform solution is dried over anhydrous sodium sulfate, then is evaporated to dryness to produce 17α-acetoxy-6α-methyl-1,20-dioxo-1,2-seco-A-norpregn-3-en-2-oic acid.

By substituting an equivalent quantity of 1,2-dihydroxy - 6α - methyl - 17α - propionoxypregn - 4 - ene-3,20-dione and otherwise proceeding according to the processes of this example, 6α-methyl-1,20-dioxo-17α-propionoxy-1,2-seco-A-norpregn-3-en-2-oic acid is obtained.

Example 11

A solution of 7.39 parts of 1,2-dihydroxy-6α-methylpregn-4-ene-3,20-dione in 170 parts of acetic acid containing 25 parts of water is treated with 27.28 parts of lead tetracetate, and the resulting reaction mixture is heated with stirring at 50–60° for about 2 hours. The addition of 1.2 parts of formic acid destroys the unreacted reagent. Water is then added, and the aqueous mixture is extracted with chloroform. The organic layer is purified by successive washings with dilute aqueous potassium carbonate and water, then is dried over anhydrous sodium sulfate. Concentration to dryness in vacuo produces 6α-methyl-1,20-dioxo-1,2-seco-A-norpregn-3-en-2-oic acid.

Example 12

The substitution of an equivalent quantity of 6α-methyl-1,20-dioxo-1,2-seco-A-norpregn-3-en-2-oic acid in the procedure of Example 3 results in 20-hydroxy-6α-methyl-2-oxapregn-4-en-3-one.

Example 13

By substituting an equivalent quantity of 20-hydroxy-6α-methyl-2-oxapregn-4-en-3-one and otherwise proceeding according to the processes of Example 4, 6α-methyl-2-oxapregn-4-ene-3,20-dione is obtained. It is represented by the structural formula

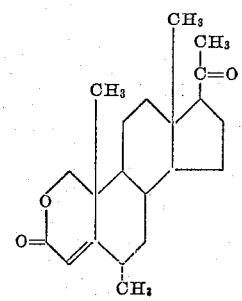

Example 14

The substitution of an equivalent quantity of 17α-acetoxy-6α - methyl - 1,20-dioxo-1,2-seco-A-norpregn-3-en-2-oic acid or 6α - methyl - 1,20 - dioxo-17α-propionoxy-1,2-seco-A-norpregn-3-en-2-oic acid in the procedure of Example 7 results in 17α-acetoxy-6α-methyl-2-oxapregn-4-ene-3,20-dione of the structural formula

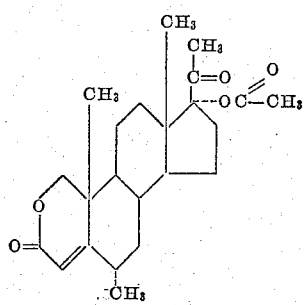

and 6α-methyl-17α-propionoxy-2-oxapregn-4-ene-3,20-dione of the structural formula

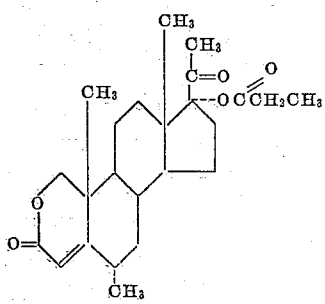

Example 15

To a solution of one part of 2-oxapregn-4-ene-3,20-dione in 80 parts of ethanol is added 0.2 part of 10% palladium-on-carbon catalyst, and this mixture is shaken in a hydrogen atmosphere at atmospheric pressure until one molecular equivalent of hydrogen is absorbed. The catalyst is removed by filtration, and the filtrate is concentrated to dryness under nitrogen to yield 2-oxapregnane-3,20-dione. Chromatography of this crude product on silica gel followed by elution with 50% ethyl acetate in benzene produces 2-oxa-5α-pregnane-3,20-dione, M.P. about 189–191°, of the structural formula

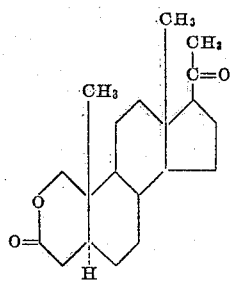

and 2-oxa-5β-pregnane-3,20-dione of the structural formula

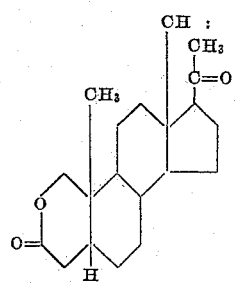

Example 16

The substitution of an equivalent quantity of 6α-methyl-2-oxapregn-4-ene-3,20-dione, 17α-acetoxy-2-oxapregn-4-ene-3,20-dione, 17α-acetoxy-6α-methyl-2-oxapregn-4-ene-3,20-dione, 6α-methyl-17α-propionoxy-2-oxapregn-4-ene-3,20-dione, or 17α-propionoxy-2-oxapregn-4-ene-3,20-dione in the procedure of Example 15 results in the 5α and 5β isomers of 6α-methyl-2-oxapregnane-3,20-dione, 17α-acetoxy-2-oxapregnane-3,20-dione, 17α-acetoxy-6α-methyl-2-oxapregnane-3,20-dione, 6α-methyl-17α-propionoxy-2-oxapregnane-3,20-dione, and 17α-propionoxy-2-oxapregnane-3,20-dione, respectively.

Example 17

The substitution of an equivalent quantity of 20-hydroxy-2-oxapregnan-3-one in the procedure of Example 4 results in 2-oxapregnane-3,20-dione. This epimeric mixture is separated by adsorption on silica gel followed by elution with 50% ethyl acetate in benzene to yield 2-oxa-5α-pregnane-3,20-dione, M.P. about 189–191°, and 2-oxa-5β-pregnane-3,20-dione.

Example 18

To a solution of 7.7 parts of 17α-acetoxy-3β-hydroxy-6-methylpregn-5-en-20-one in 67 parts of methylene chloride, cooled to 0–5°, is added dropwise with stirring 40 parts by volume of a 0.5 molar perbenzoic acid solution in benzene, at such rate that the temperature does not rise above 25°. After the addition is completed, this mixture is diluted with chloroform, then washed successively with aqueous sodium hydroxide and water, dried over anhydrous sodium sulfate, and evaporated to dryness at reduced pressure. The resulting crystalline residue is recrystallized from methanol to afford pure 17α-acetoxy-5α,6α-epoxy-3β-hydroxy-6β-methylpregnan-20-one, melting at about 215–219°.

The substitution of an equivalent quantity of 3β-hydroxy-6-methyl-17α-propionoxypregn-5-en-20-one in the processes of this example results in 5α,6α-epoxy-3β-hydroxy-6β-methyl-17α-propionoxypregnan-20-one.

Example 19

To a solution of 1.16 parts of 17α-acetoxy-5α,6α-epoxy-3β-hydroxy-6β-methylpregnan-20-one in 16 parts of acetone is added 0.9 part by volume of an aqueous solution, 8 N in chromium trioxide and 8 N in sulfuric acid. This mixture is stirred at room temperature for about 3 minutes, then is treated with 0.1 part of isopropyl alcohol to destroy the excess reagent. Removal of the solvent at reduced pressure affords a residue, which is extracted with chloroform. This organic extract is washed successively with water, aqueous sodium hydroxide, and water, dried over anhydrous sodium sulfate, and concentrated to dryness under reduced pressure. Recrystallization of the residue from benzene affords pure 17α-acetoxy-5α,6β-dihydroxy-6α-methylpregnane-3,20-dione, M.P. about 258–261° (dec.).

By substituting an equivalent quantity of 5α,6α-epoxy-3β-hydroxy-6β-methyl-17α-propionoxypregnan-20-one and otherwise proceeding according to the hereindescribed processes, 5α,6β-dihydroxy-6α-methyl-17α-propionoxypregnane-3,20-dione is obtained.

Example 20

To a solution of 4 parts of 17α-acetoxy-5α,6β-dihydroxy-6α-methylpregnane-3,20-dione in 264 parts of benzene is added 2.7 parts of dichlorodicyanoquinone, and this reaction mixture is heated at reflux for about 16 hours, then is cooled and filtered. The filtrate is washed successively with aqueous sodium sulfite, aqueous sodium hydroxide and water, then is dried over anhydrous sodium sulfate and evaporated to dryness to afford 17α-acetoxy-6β-hydroxy-6α-methylpregna-1,4-diene-3,20-dione. Recrystallization from benzene affords a pure sample melting at about 274–282°. It is further characterized by an ultraviolet maximum at about 244 millimicrons with a molecular extinction coefficient of about 15,200.

The substitution of an equivalent quantity of 5α,6β-dihydroxy-6α-methyl-17α-propionoxypregnane-3,20-dione in the procedure of this example affords 6β-hydroxy-6α-methyl-17α-propionoxypregna-1,4-diene-3,20-dione.

Example 21

To a solution of 6 parts of 17α-acetoxy-5α,6β-dihydroxy-6α-methylpregnane-3,20-dione in 88 parts of benzene and 67 parts of methylene chloride is added 7 parts of Woelm basic alumina (activity I), described by H. Brockmann et al., Ber., 74, 73 (1941), and the mixture is stirred at room temperature for about 60 hours. The catalyst is removed by filtration and washed on the filter with 50% benzene in methylene chloride. The filtrate is evaporated to dryness to afford colorless prisms of 17α-acetoxy-6β-hydroxy-6α-methylpregn-4-ene-3,20-dione, M.P. about 223–225°. It displays an ultraviolet maximum at about 237.5 millimicrons with a molecular extinction coefficient of about 13,200.

By substituting an equivalent quantity of 6β-hydroxy-6α-methyl-17α-propionoxypregnane-3,20-dione and otherwise proceeding according to the herein-described processes, 6β-hydroxy-6α-methyl-17α-propionoxypregn-4-ene-3,20-dione is obtained.

*Example 22*

The substitution of 4.1 parts of 17α-acetoxy-6β-hydroxy-6α-methylpregn-4-ene-3,20-dione in the procedure of Example 20, results in 17α-acetoxy-6β-hydroxy-6α-methylpregna-1,4-diene-3,20-dione, identical with the product of Example 14.

*Example 23*

To a mixture of 3 parts of chromium trioxide with 30 parts of pyridine is added a solution of 1.5 parts of 17α-acetoxy-5α,6α-epoxy-3β-hydroxy-6β-methylpregnan-20-one, and the reaction mixture is stirred at room temperature for about 2½ hours, then is stored at room temperature for about 16 hours. The suspension is diluted with benzene and filtered. The filtrate is washed successively with water, 5% aqueous sodium hydroxide, and water, dried over anhydrous sodium sulfate, and stripped of solvent at room temperature and reduced pressure. Recrystallization of the residue from benzene affords 17α-acetoxy-6α-hydroxy-6β-methylpregn-4-ene-3,20-dione, M.P. about 246–249°. It exhibits an ultraviolet maximum at about 242 millimicrons with a molecular extinction coefficient of about 13,600.

The benzene mother liquor is concentrated to dryness to yield 17α-acetoxy-5α,6α-epoxy-6β-methylpregnane-3,20-dione, M.P. about 204–216°.

The substitution of an equivalent quantity of 5α,6α-epoxy-3β-hydroxy-6β-methyl-17α-propionoxypregnan-20-one in the procedure of this example affords 6α-hydroxy-6β-methyl-17α-propionoxypregn-4-ene-3,20-dione and 5α,6α-epoxy-6β-methyl-17α-propionoxypregnane-3,20-dione.

*Example 24*

A solution of one part of 17α-acetoxy-5α,6α-epoxy-6β-methylpregnane-3,20-dione in 20 parts of pyridine is allowed to stand at room temperature for about 16 hours, then is concentrated to dryness to afford 17α-acetoxy-6α-hydroxy-6β-methylpregn-4-ene-3,20-dione, identical with the product of Example 23.

*Example 25*

The substitution of 3.9 parts of 17α-acetoxy-6α-hydroxy-6β-methylpregn-4-ene-3,20-dione or 4 parts of 6α-hydroxy-6β-methyl-17α-propionoxypregn-4-ene-3,20-dione in the procedure of Example 20 results in 17α-acetoxy-6α-hydroxy-6β-methylpregna-1,4-diene-3,20-dione and 6α-hydroxy-6β-methyl-17α-propionoxypregna-1,4-diene-3,20-dione, respectively.

*Example 26*

To a solution of 38 parts of 17α-acetoxy-6β-hydroxy-6α-methylpregna-1,4-diene-3,20-dione in 390 parts of tertiary-butyl alcohol containing 400 parts of water is added 2.5 parts of osmium tetroxide and 4.9 parts of potassium chlorate, and this mixture is kept at room temperature for about 14 days, then is concentrated at reduced pressure and room temperature to a small volume. The oily layer which separates is dissolved in 150 parts of pyridine and treated with a solution of 6 parts of sodium bisulfite in 90 parts of water. This mixture is stirred for about 15 hours, then is extracted with benzene. The benzene layer is washed successively with dilute hydrochloric acid, water, aqueous sodium hydroxide, and water, dried over anhydrous sodium sulfate and concentrated to dryness at reduced pressure to yield 17α-acetoxy-1,2,6β-trihydroxy-6α-methylpregn-4-ene-3,20-dione.

By substituting an equivalent quantity of 6β-hydroxy-6α-methyl-17α-propionoxypregna-1,4-diene-3,20-dione, and otherwise proceeding according to the processes of this example, 1,2,6β-trihydroxy-6α-methyl-17α-propionoxypregn-4-ene-3,20-dione is obtained.

*Example 27*

A mixture of 4.1 parts of 17α-acetoxy-1,2,6β-trihydroxy-6α-methylpregn-4-ene-3,20-dione, 14.5 parts of lead tetracetate, 35 parts of acetic acid, and 5 parts of water is heated at 50–60° for about 1½ hours with stirring, then is treated with 0.6 part of formic acid and is diluted with water. Extraction with chloroform affords an organic solution, which is washed successively with dilute aqueous potassium carbonate and water, dried over anhydrous sodium sulfate, and concentrated to dryness at reduced pressure, resulting in 17α-acetoxy-6β-hydroxy-6α-methyl-1,20-dioxo-1,2-seco-A-norpregn-3-en-2-oic acid.

The substitution of an equivalent quantity of 1,2,6β-trihydroxy-6α-methyl-17α-propionoxypregn-4-ene-3,20-dione in the procedure of this example affords 6β-hydroxy-6α-methyl-1,20-dioxo-17α-propionoxy-1,2-seco-A-norpregn-3-en-2-oic acid.

*Example 28*

A mixture of 5.4 parts of 17α-acetoxy-6β-hydroxy-6α-methyl-1,20-dioxo-1,2-seco-A-norpregn-3-en-2-oic acid, 5.4 parts of sodium borohydride, and 70 parts of isopropyl alcohol is stirred at room temperature for about 2 hours, then is cooled by means of an ice bath and treated with 80 parts of acetone. The resulting mixture is added to an ice-cold solution consisting of 80 parts of acetone, 400 parts of water, and 24 parts of concentrated hydrochloric acid. This mixture is concentrated to dryness at reduced pressure, and the resulting residue is extracted with chloroform. The organic layer is then washed successively with cold dilute aqueous sodium hydroxide and water, is dried over anhydrous sodium sulfate, and is concentrated to dryness at reduced pressure to afford 17α-acetoxy-6β-hydroxy-6α-methyl-2-oxapregn-4-ene-3,20-dione.

By substituting an equivalent quantity of 6β-hydroxy-6α-methyl-1,20-dioxo-17α-propionoxy-1,2-seco-A-norpregn-3-en-2-oic acid and otherwise proceeding according to the herein-described processes 6β-hydroxy-6α-methyl-17α-propionoxy-2-oxapregn-4-ene-3,20-dione is obtained.

*Example 29*

To a solution of one part of 17α-acetoxy-6β-hydroxy-6α-methyl-2-oxapregn-4-ene-3,20-dione in 87 parts of toluene is added 0.2 part of p-toluenesulfonic acid monohydrate, and the reaction mixture is distilled slowly for about 2 hours, then is cooled and washed successively with aqueous sodium bicarbonate and water, dried over anhydrous sodium sulfate, and concentrated to dryness at reduced pressure, resulting in 17α-acetoxy-6-methyl-2-oxapregna-4,6-diene-3,20-dione. It is represented by the structural formula

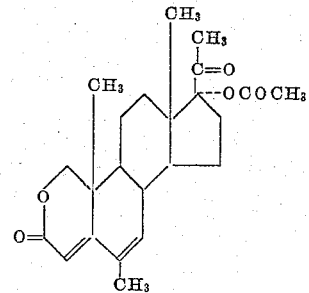

The substitution of an equivalent quantity of 6β-hydroxy-6α-methyl-17α-propionoxy-2-oxapregn-4-ene-3,20-dione in the procedure of this example results in 6-methyl-17α-propionoxy-2-oxapregna-4,6-diene-3,20-dione.

Example 30

A mixture of 4 parts of 17α-acetoxy-6β-hydroxy-6α-methyl-2-oxapregn-4-ene-3,20-dione, 1.3 parts of phosphorus oxychloride, and 10 parts of dry pyridine is stored at room temperature for about 16 hours. Water and ice are added, and the resulting aqueous mixture is extracted with chloroform. The chloroform layer is separated, washed successively with dilute hydrochloric acid, water, dilute aqueous sodium hydroxide, and water, dried over anhydrous sodium sulfate and evaporated to dryness in vacuo to afford 17α-acetoxy-6-methyl-2-oxapregna-4,6-diene-3,20-dione, identical with the product of Example 29.

The substitution of an equivalent quantity of 6β-hydroxy - 6α-methyl-17α-propionoxy-2-oxapregn-4-ene-3,20-dione in the procedure of this example results in 6-methyl-17α-propionoxy-2-oxapregna-4,6-diene-3,20-dione, identical with the product of Example 29.

Example 31

A mixture of 39 parts of 17α-acetoxy-6α-methylpregn-4-ene-3,20-dione, 53 parts of lead tetracetate and 630 parts of acetic acid is heated at 80–85° with stirring for about 2 hours, then is diluted with water and extracted with benzene. The benzene extract is washed successively with water, aqueous sodium hydroxide, and water, dried over anhydrous sodium sulfate, and concentrated to dryness. The resulting residue is dissolved in benzene and chromatographed on silica gel. Elution with 20% ethyl acetate in benzene affords 2α,17α-diacetoxy-6α-methylpregn-4-ene-3,20-dione.

By substituting an equivalent quantity of 6α-methyl-17α-propionoxypregn-4-ene-3,20-dione and otherwise proceeding according to the processes of this example, 2α-acetoxy - 6α - methyl - 17α-propionoxypregn-4-ene-3,20-dione is obtained.

Example 32

A mixture of 10 parts of 2α,17α-diacetoxy-6α-methylpregn-4-ene-3,20-dione, 1.3 parts of potassium hydroxide, 240 parts of methanol, and 20 parts of water is stirred at room temperature for about 15 minutes, then is acidified with acetic acid and concentrated to a small volume at reduced pressure. The residue is diluted with water, then extracted with chloroform. The organic extract is washed successively with aqueous sodium hydroxide and water, dried over anhydrous sodium sulfate, and stripped of solvent at reduced pressure to yield 17α-acetoxy-2α-hydroxy-6α-methylpregn-4-ene-3,20-dione.

The substitution of an equivalent quantity of 2α-acetoxy-6α-methyl-17α-propionoxypregn-4-ene-3,20-dione in the procedure of this example results in 2α-hydroxy-6α-methyl-17α-propionoxypregn-4-ene-3,20-dione.

Example 33

To a solution of 37 parts of 17α-acetoxypregn-4-ene-3,20-dione in 800 parts of dry carbon tetrachloride is added 20 parts of N-bromosuccinimide, and the reaction mixture is heated at reflux with stirring for about one hour, while being subjected to infrared irradiation. This mixture is cooled, washed successively with water, aqueous sodium sulfite and water, dried over anhydrous sodium sulfate, and evaporated to dryness to yield 17α-acetoxy-6-bromopregn-4-ene-3,20-dione.

A mixture of the crude 17α-acetoxy-6-bromopregn-4-ene-3,20-dione, 120 parts of potassium acetate, and 788 parts of acetic acid is heated at reflux for about one hour, then is cooled, diluted with water, and extracted with benzene. The benzene extract is washed successively with water, dilute aqueous sodium hydroxide, and water, then is dried over anhydrous sodium sulfate and stripped of solvent in vacuo. Chromatography of a benzene solution of the residue on silica gel followed by elution with 20% ethyl acetate in benzene affords 2α,17α-diacetoxypregn-4-ene-3,20-dione.

The substitution of an equivalent quantity of 17α-propionoxypregn-4-ene-3,20-dione in the processes of this example results in 2α-acetoxy-17α-propionoxypregn-4-ene-3,20-dione.

Example 34

The substitution of 9.7 parts of 2α,17α-diacetoxypregn-4-ene-3,20-dione or 10 parts of 2α-acetoxy-17α-propionoxypregn-4-ene-3,20-dione in the procedure of Example 32 results in 17α-acetoxy-2α-hydroxypregn-4-ene-3,20-dione and 2α - hydroxy-17α-propionoxypregn-4-ene-3,20-dione, respectively.

Example 35

A mixture of 4 parts of 17α-acetoxy-2α-hydroxy-6α-methylpregn-4-ene-3,20-dione, 2.3 parts of periodic acid dihydrate, 40 parts of pyridine, and 10 parts of water is stirred at room temperature for about 36 hours. The reaction mixture is then extracted with chloroform, and the organic extract is washed successively with water and aqueous potassium carbonate. Extraction of this washed solution with ice-cold 5% aqueous sodium hydroxide affords an alkaline extract, which is acidified by means of excess acetic acid. The resulting precipitate is extracted with chloroform, and the chloroform extract is washed with water, then is evaporated to dryness under nitrogen to yield 17α-acetoxy-6α-methyl-2,20-dioxo-2,3-secopregn-4-en-3-oic acid.

By substituting an equivalent quantity of 2α-hydroxy-17α-propionoxypregn-4-ene-3,20-dione or 2α-hydroxy-6α-methyl-17α-propionoxypregn-4-ene-3,20-dione in the procedure of this example, 17α-propionoxy-2,20-dioxo-2,3-secopregn-4-en-3-oic acid and 6α-methyl-17α-propionoxy-2,20-dioxo-2,3-secopregn-4-en-3-oic acid are obtained.

Example 36

A mixture of one part of 17α-acetoxy-6α-methyl-2,20-dioxo-2,3-secopregn-4-en-3-oic acid, 0.9 part of sodium borohydride and 120 parts of anhydrous isopropyl alcohol is stirred at room temperature for about one hour, then is cooled by means of an ice-bath and treated with 8 parts of acetone. The resulting mixture is added to an ice-cold solution containing 40 parts of water, 8 parts of acetone and 2.4 parts of concentrated hydrochloric acid, then is concentrated to a small volume at reduced pressure. The residue is diluted with water and extracted with chloroform. The organic layer is washed with water, dried over anhydrous sodium sulfate and stripped of solvent at reduced pressure and room temperature to produce 17α-acetoxy-2-hydroxy-6α-methyl-20-oxo - 2,3-secopregn-4-en-3-oic acid. On the other hand, concentration of the organic layer to dryness on the steam bath results in 17α-acetoxy - 6α - methyl-3-oxa-A-homopregn-4a-ene-4,20-dione, which is represented by the structural formula

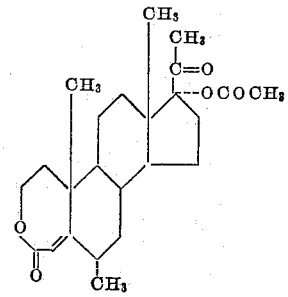

The substitution of an equivalent quantity of 17α-propionoxy-2,20-dioxo-2,3-secopregn-4-en-3-oic acid in the processes of this example affords 2-hydroxy-17α-propionoxy-20-oxo-2,3-secopregn-4-en-3-oic acid and 17α-propionoxy-3-oxa-A-homopregn-4a-ene - 4,20-dione, while the substitution of 6α-methyl-17α-propionoxy-2,20-dioxo-2,3-secopregn-4-en-3-oic acid results in 2-hydroxy-6α-methyl-20-oxo-17α-propionoxy-2,3-secopregn-4-en - 3 - oic acid and 6α-methyl-17α-propionoxy-3-oxa-A-homopregn-4a-ene-4,20-dione.

Example 37

The substitution of 3.1 parts of 2α-hydroxypregn-4-ene-3,20-dione or 3.2 parts of 2α-hydroxy-6α-methylpregn-4-ene-3,20-dione in the procedure of Example 35 results in 2,20-dioxo-2,3-secopregn-4-en-3-oic acid and 6α-methyl-2,20-dioxo-2,3-secopregn-4-en-3-oic acid, respectively.

Example 38

A mixture of one part of 2,20-dioxo-2,3-secopregn-4-en-3-oic acid, one part of sodium borohydride, and 100 parts of water is stirred at room temperature for about one hour. The reaction mixture is cooled, acidified with excess hydrochloric acid and extracted with chloroform. The organic extract is washed with water, dried over anhydrous sodium sulfate, and concentrated at room temperature and reduced pressure to afford 2,20-dihydroxy-2,3-secopregn-4-en-3-oic acid. Evaporation of the solvent on the steam bath, however, produces 20-hydroxy-3-oxa-A-homopregn-4a-en-4-one.

Example 39

A solution of one part of 20-hydroxy-3-oxa-A-homopregn-4a-en-4-one in 40 parts of acetone is treated with one part by volume of an aqueous solution, 8 N in chromium trioxide and 8 N in sulfuric acid, at room temperature for about 5 minutes. To the reaction mixture is then added 0.16 part of isopropyl alcohol. Concentration of this mixture to dryness under nitrogen at room temperature produces a residue, which is extracted with benzene. The organic layer is washed successively with water, aqueous sodium hydroxide and water, dried over anhydrous sodium sulfate, and evaporated to dryness at reduced pressure to yield 3-oxa-A-homopregn-4a-ene-4,20-dione of the structural formula

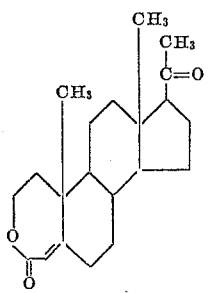

Example 40

The substitution of one part of 6α-methyl-2,20-dioxo-2,3-secopregn-4-en-3-oic acid in the procedure of Example 38 results in 2,20-dihydroxy-6α-methyl-2,3-secopregn-4-en-3-oic acid and 20-hydroxy-6α-methyl-3-oxa-A-homopregn-4a-en-4-one.

Example 41

The substitution of one part of 20-hydroxy-6α-methyl-3-oxa-A-homopregn-4a-en-4-one in the procedure of Example 39 results in 6α-methyl-3-oxa-A-homopregn-4a-ene-4,20-dione of the structural formula

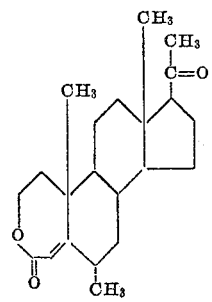

Example 42

The substitution of 3.9 parts of 17α-acetoxy-2α-hydroxypregn-4-ene-3,20-dione in the procedure of Example 35 results in 17α-acetoxy-2,20-dioxo-2,3-secopregn-4-en-3-oic acid.

Example 43

By substituting one part of 17α-acetoxy-2,20-dioxo-2,3-secopregn-4-en-3-oic acid and otherwise proceeding according to the processes of Example 36, 17α-acetoxy-2-hydroxy-20-oxo-2,3-secopregn-4-en-3-oic acid and 17α-acetoxy-3-oxa-A-homopregn-4a-ene-4,20-dione are obtained.

What is claimed is:
1. A member selected from the class consisting of compounds of the formula

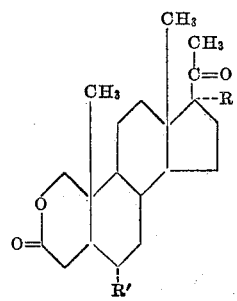

and the 4,5-dehydro and 4,5;6,7-bisdehydro derivatives thereof, wherein R is selected from the group consisting of hydrogen and (lower alkanoyl)oxy, and R' is selected from the group consisting of hydrogen and methyl.

2. 2-oxapregn-4-ene-3,2-dione.
3. 2-oxapregnane-3,20-dione.
4. 6α-methyl-2-oxapregn-4-ene-3,20-dione.
5. 17α-acetoxy-6α-methyl-2-oxapregnane-3,20-dione.
6. A compound of the formula

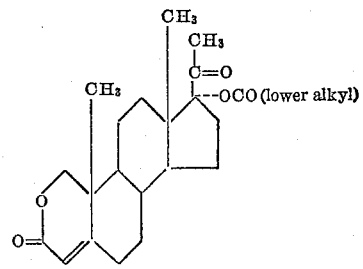

7. 17α-acetoxy-2-oxapregn-4-ene-3,20-dione.
8. A compound of the formula

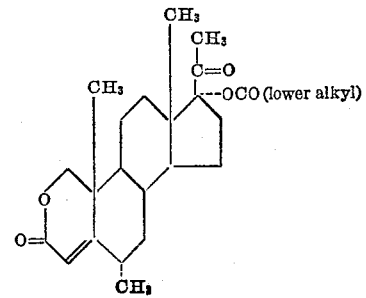

9. 17α-acetoxy-6α-methyl-2-oxapregn-4-ene-3,20-dione.
10. A compound of the formula

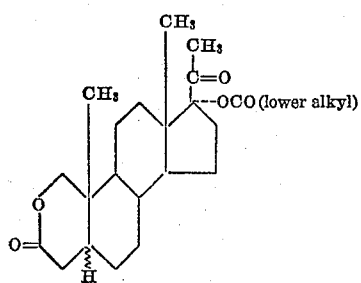

11. 17α-acetoxy-2-oxapregnane-3,20-dione.
12. A compound of the formula

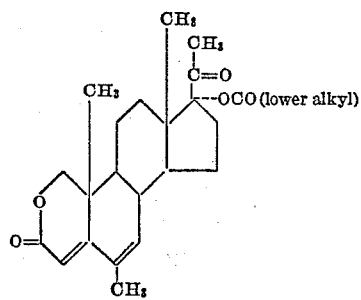

13. 17α-acetoxy-6-methyl-2-oxapregna-4,6-diene-3,20-dione.

14. A compound of the formula

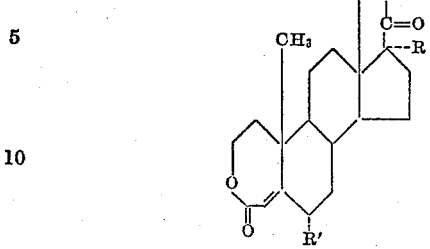

wherein R is selected from the group consisting of hydrogen and (lower alkanoyl)oxy and R' is selected from the group consisting of hydrogen and methyl.

15. 3-oxa-A-homopregn-4a-ene-4,20-dione.
16. A compound of the formula

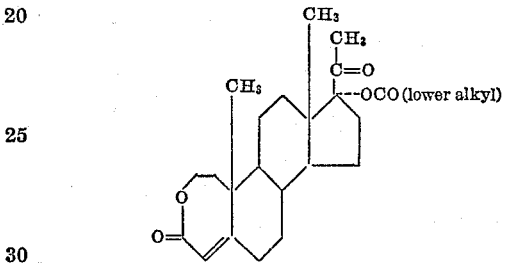

17. 17α-acetoxy-3-oxa-A-homopregn-4a-ene-4,20-dione.

No references cited.